Sept. 3, 1929.  G. FORNACA  1,726,615
WHEEL SUSPENSION MEANS FOR MOTOR VEHICLES
Filed July 13, 1927
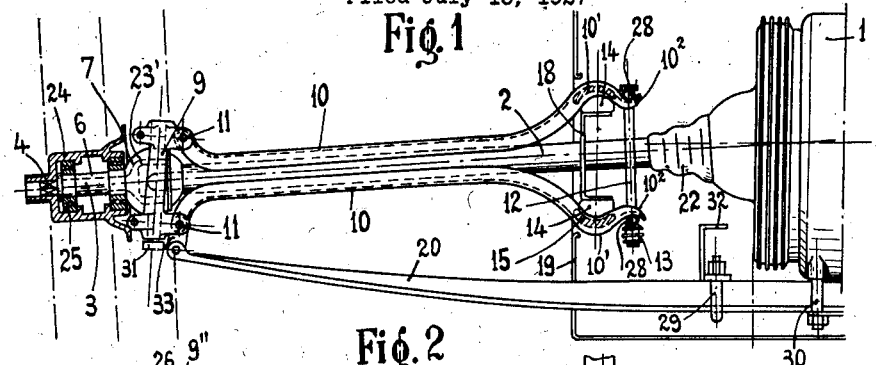
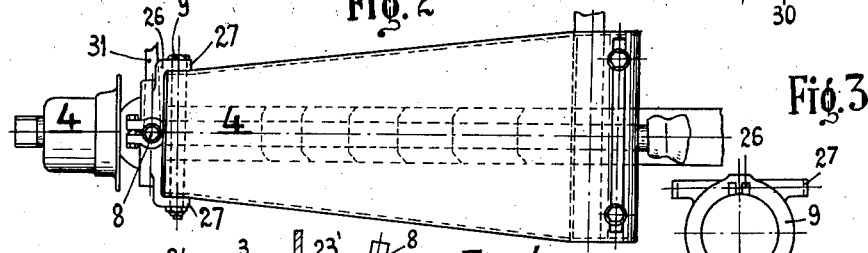
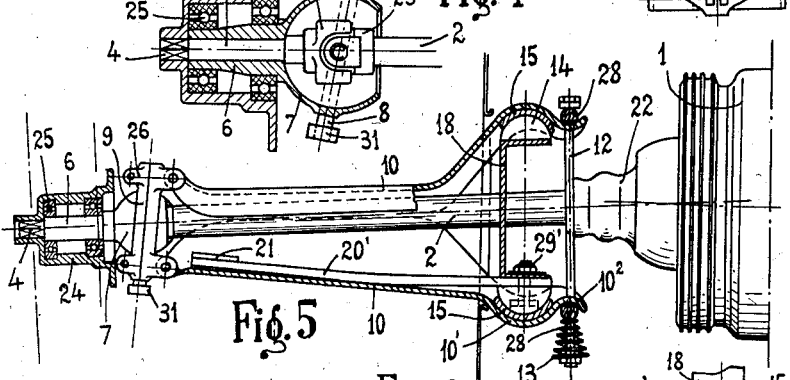
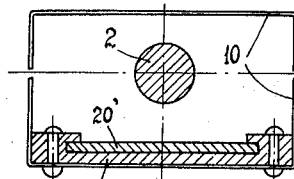
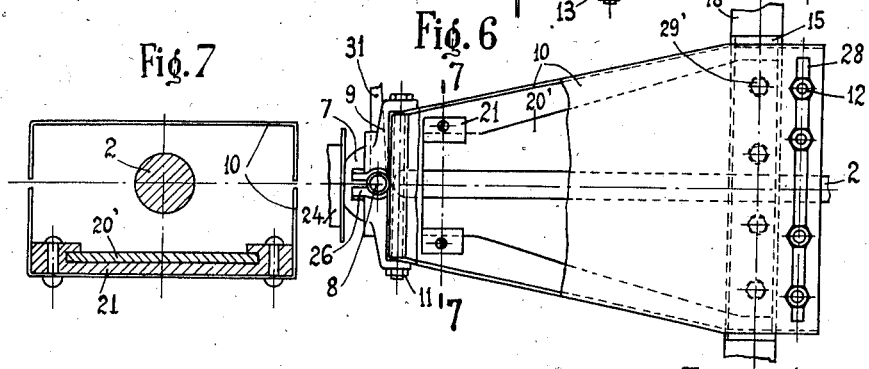
Inventor:
Guido Fornaca
By Emil Bonnelycke
Attorney Patented Sept. 3, 1929.

1,726,615

UNITED STATES PATENT OFFICE.

GUIDO FORNACA, OF TURIN, ITALY.

WHEEL-SUSPENSION MEANS FOR MOTOR VEHICLES.

Application filed July 13, 1927, Serial No. 205,460, and in Italy July 16, 1926.

This invention relates to motor vehicles and more particularly to means for mounting the wheels in motor vehicles.

One object of this invention is to provide a mounting for driving and steering wheels in motor vehicles in which the drive is made by means of shafts including flexible or Cardan joints, and the connection of each wheel-carrying swivel with the vehicle frame is made by means of a supporting structure which includes two arms pivotally connected at one end with a swivel-carrying frame and at the other end with the vehicle frame.

Another object of the invention is to provide a structure of the kind above referred to, which comprises members shaped to enclose the driving parts which are thus protected against mud and the like.

Still another object is to provide friction damping means at the point of articulation of the members of said structure with the vehicle frame to damp the oscillations of resilient members of the suspension means, said suspension means comprising preferably a number of leaf springs.

In the annexed drawing:—

Figure 1 is a fragmentary front view with parts in section of one embodiment of the wheel-mounting means according to this invention;

Figure 2 is a plan view;

Figure 3 is a detail view of a frame carrying a wheel swivel;

Figure 4 is an enlarged vertical section on line 4—4 of Figure 2;

Figure 5 is a view similar to Figure 1 of a modified construction;

Figure 6 is a plan view of Figure 5;

Figure 7 is a detail sectional view on a larger scale of the spring mounting, the section being taken on line 7—7 of Fig. 6.

In the drawing, 1 is the casing of a differential gear driving a pair of wheels, one of which is indicated in dotted lines, and on the side of said gear extends a driving axle 2 which is connected with the differential gear by a flexible joint (not shown) enclosed in a flexible protecting sleeve 22. The outer end of said axle 2 is connected by means of a flexible joint 23—23' (Fig. 4) with a stub shaft or spindle 3 journalled in a supporting sleeve 6 and rigidly connected by means of a square end portion 4 with a wheel hub 24 which is mounted to rotate on said supporting sleeve 6 by means of ball bearings 25 and carrying the wheel.

A hollow cover 7 extends from said sleeve 6 to protect and enclose the said flexible joint 23—23'.

Aligning pivot pins 8 are provided on cover 7 to fit in seats 26 formed on a supporting frame 9 and thus enable a swinging movement of the cover and the sleeve 6; said frame having extensions 27 by which it is pivotally connected through the intermediary of pivot bolts 11 with two elongated plate arms 10 extending transversely to the longitudinal axis of the vehicle.

On the vehicle frame 18 are secured elongated horizontal supports 14 of semicircular cross section, which are enclosed in the vehicle body 19 and are positioned longitudinally with respect to the vehicle frame, they being spaced from each other to provide an intermediate space for the passage of axle 2. Arms 10 are provided with recessed portions or seats 10' adapted to bear against the adjacent supports 14; and bolts 12, which pass through reinforcing bars 28 seated in the upturned edges $10^2$ of said seats act to hold the seats engaged on said supports; springs 13 are interposed between the lower reinforcing bar 28 and nuts mounted on the lower ends of connecting bolts 12 to provide for a resilient interengagement of the parts in the position shown on the drawing.

Linings 15 of high friction material are provided on said supports 14, and the ends of arms 10 are resiliently forced against said linings 15 by the above described means.

Arms 10 are intended to support longitudinal stresses acting on the wheel carried by them, that is, stresses parallel to the longitudinal axis of the vehicle, and they taper or decrease in width from their inner to their outer ends.

The resilient action of the suspension is obtained by means of a leaf spring 20 whose intermediate portion is fastened at 29 and 30 on a member 32 of the vehicle frame and on the differential casing 1, while its end is connected by means of a shackle 33 with the wheel supporting frame 9.

A steering gear of any conventional type may be used in connection with the above described construction, said steering gear comprising arms 31 each rigidly related to a sleeve 6 and cover 7 and means for controlling said arms; said controlling means are connected with and actuated by the steering wheel, as is usual.

An efficient damping action with respect to shocks and jolts is secured by the described provision of the linings 15 between the seats 10' of arms 10 carrying the wheel and the stationary supports 14 fastened on the vehicle frame.

The embodiment of Figures 5, 6 and 7 is similar to the above described one in its general lines, but the resilient suspension member or spring 20' is located within the space confined between plate arms 10.

As shown in said figures, in this construction the spring 20' comprises a single leaf fastened on the vehicle frame by means of bolts 29 and having its free end slidably engaged in a guide member 21 which is secured on the outer end of the bottom plate arm 10.

In the embodiment illustrated, the single leaf of spring 20' has a constant thickness throughout its length and a tapering width (Fig. 6) to provide an even resistance with respect to stresses acting in a direction parallel with the longitudinal axis of the vehicle and to bending stresses.

Any usual leaf spring, however, could be used in this construction, such spring having its master leaf engaged in a guide fastened on the adjacent plate arm.

In operation, the wheel hub 24 and its wheel are able to move vertically with respect to the vehicle frame, as required for suspension purposes, because arms 10 may swing around their supports 14 and frame 9 links the ends of said arm, their swinging motion being damped by spring 20 and by friction linings 15; at the same time, steering movements of the wheel hub are provided for by means of the described mounting of the swivel sleeve 6 and cover 7 and the drive is imparted to the wheel hub by the axle 2 and its flexible joints.

Of course this invention is not restricted to the precise embodiments illustrated, but is intended to cover modifications and changes within its scope as claimed.

What I claim as my invention and desire to secure by United States Letters Patent is:—

1. A mounting for steering and driving wheels in motor vehicles, comprising supporting members fastened on the vehicle frame, members extending transversely to said vehicle frame and having one end engaged on said supporting members for pivotal vertical movement, a link member interconnecting the other ends of said transverse members, a wheel-supporting swivel member mounted for steering movements in said link member, a wheel hub on said swivel member, means for driving said wheel hub, friction means between said supporting members and transverse members for damping the vertical oscillations of the transverse members, a leaf spring secured on said vehicle frame, and means connecting one end of said spring with the interconnected ends of said transverse members.

2. A mounting for steering and driving wheels in motor vehicles, comprising supporting members fastened on the vehicle frame, members extending transversely to said vehicle frame and having one end engaged on said supporting members for pivotal vertical movement, a link member interconnecting the other ends of said transverse members, a wheel-supporting swivel member mounted for steering movements in said link member, a wheel hub on said swivel member, means for driving said wheel hub, friction means between said supporting members and cooperating ends of said transverse members for damping the vertical oscillations of the transverse members, spring means forcing the last named ends of said transverse members against said friction means and supporting members, a leaf spring secured on said vehicle frame, and means connecting one end of the spring with the interconnected ends of said transverse members.

3. A mounting for steering and driving wheels in motor vehicles, comprising elongated supporting members fastened on the vehicle frame, plate arms extending transversely to said vehicle frame and having end seats engaging said supporting members for vertical swinging movement thereon, means for resiliently forcing said plate arm seats against said supporting members, a link member interconnecting the other ends of said plate arms, a wheel-supporting swivel member mounted for steering movements in said link member, a wheel hub on said swivel member, a leaf spring secured to the vehicle frame and having one end free and means connecting said free end of the spring with the interconnected ends of the plate arms.

4. A mounting for steering and driving wheels in motor vehicles, comprising elongated supporting members fastened on the vehicle frame, plate arms extending transversely to said vehicle frame and having end seats engaging said supporting members for vertical swinging movement thereon, friction means intermediate said supporting members and seats for damping the vertical oscillations of said arms, means for resiliently forcing said plate arm seats against said friction means and supporting members, a link member interconnecting the other ends of said plate arms, a wheel-supporting swivel member mounted for steering movements in said link member, a wheel hub on said swivel member, a leaf spring secured to the vehicle frame and having one end free, and means connecting said free end of the spring with the interconnected ends of the plate arms.

In testimony whereof I affix my signature.

GUIDO FORNACA.